Sept. 25, 1928.
J. O. SMITH
1,685,381
COMBINED STUFFING BOX AND SHAFT BEARING
Filed March 23, 1927
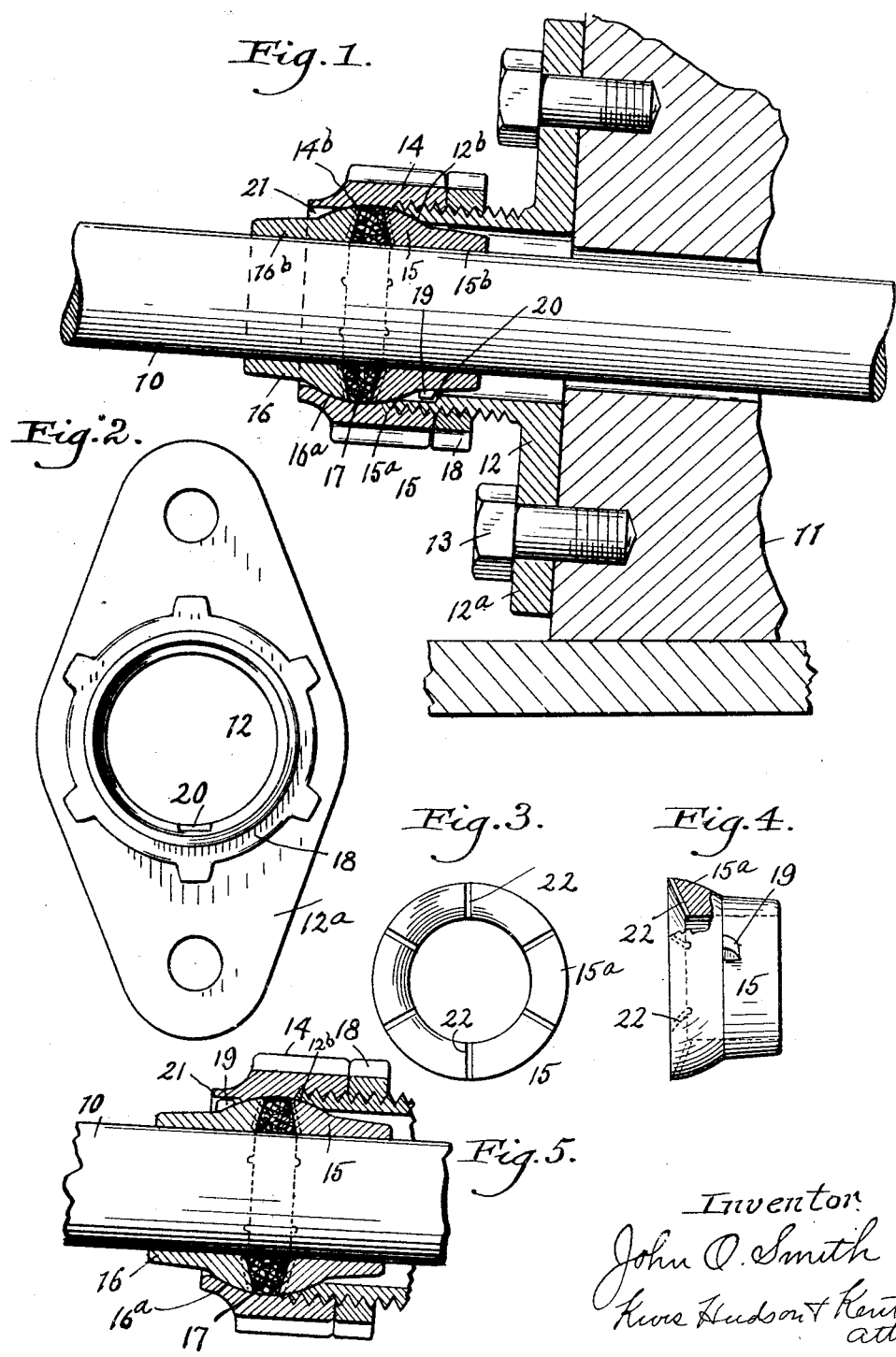
Inventor
John O. Smith Patented Sept. 25, 1928.

1,685,381

UNITED STATES PATENT OFFICE.

JOHN O. SMITH, OF CLEVELAND, OHIO, ASSIGNOR TO THE UPSON-WALTON COMPANY, OF CLEVELAND, OHIO, A CORPORATION OF OHIO.

COMBINED STUFFING BOX AND SHAFT BEARING.

Application filed March 23, 1927. Serial No. 177,491.

This invention relates to a combined stuffing box and shaft bearing particularly adapted for use with propeller shafts of motor boats, the present invention being an improvement upon the device disclosed in my prior Patent No. 1,025,884, granted May 7, 1912, in which there was disclosed a combined stuffing box and shaft bearing which not only prevents leakage but which serves as an effective universal bearing allowing freedom of movement to the shaft even in the absence of true shaft alignment.

In my prior patent, above referred to, there is disclosed a bearing provided with spherical seats clamped between spherical seats on a fixed sleeve and gland. When the gland is tight the bearing is effectually clamped and held against turning movement with the shaft but if the gland should work loose and the shaft should be permitted to operate for an extended period of time without retightening the gland there is an objectionable amount of wear on the spherical seats, due to rotation of the bearing.

The present invention has for its object to provide means for positively preventing rotation of the shaft bearing so that danger of objectionable wear on the bearing is eliminated.

The following description and the accompanying drawings set forth in detail certain means embodying the invention, the disclosed means, however, constituting but one of the various mechanical forms in which the principle of the invention may be employed.

Reference should be had to the accompanying drawings forming a part of this specification, in which:

Fig. 1 is a sectional view of a portion of a boat showing the propeller shaft in elevation and the combined stuffing box and shaft bearing in section.

Fig. 2 is a plan view of the portion of the stuffing box which is fixed to the shaft log.

Fig. 3 is an end elevation of one of the bearing members.

Fig. 4 is a side elevation of one of the bearing members.

Fig. 5 is a sectional view similar to Fig. 1 showing the bearing locked to the gland instead of to the fixed sleeve.

Referring to the accompanying drawings, the numeral 10 designates the propeller shaft which passes through shaft log 11 which may be of any suitable shape or construction. At the point where the shaft emerges from the shaft log on the interior of the boat there is provided a stuffing box consisting of a sleeve 12 having a flange 12$^a$ secured to the log 11 by means of bolts 13 and a gland or sleeve 14 adjustable on the sleeve 12, the sleeve 12 being externally threaded and the gland 14 being internally threaded and adapted to be screwed onto the sleeve 12. The shaft 10 passes freely through the sleeve and gland and is rotatable in a bearing formed of separable end members 15 and 16 and an intermediate packing 17. The sleeve 12 and gland 14 are provided near their ends with oppositely disposed spherical curved seats 12$^b$ and 14$^b$, and the bearing members 15 and 16 are provided with spherically curved bearing heads 15$^a$ and 16$^a$ against which the curved seats 12$^b$ and 14$^b$ engage. The gland may be held in any desired position of adjustment by means of a jam nut 18 which is screwed onto the threaded exterior of the sleeve 12 and is adapted to engage the inner end of the gland 14. To provide ample bearing surfaces for the shaft 10 the bearing members 15 and 16 are preferably provided with tubular extensions 15$^b$ and 16$^b$ which have an external diameter less than the internal diameters of the sleeve 12 and gland 14, so that the bearing can rock within the stuffing box. The bearing members 15 and 16 are separate members not mechanically connected and are clamped against opposite sides of the packing 17 when the gland 14 is tightened on the sleeve 12. The opposed end faces of the members 15 and 16 are preferably formed on a taper so that the space between said members is greater adjacent the shaft. Thus it will be seen that when the gland 14 is tightened or adjusted to proper position not only is universal shaft movement permitted but the packing material is squeezed against the shaft so tightly that the leakage of water along the shaft is prevented. At the same time the spherical bearing surfaces which are accurately machined and tightly clamped together prevent leakage past the exterior of the bearing.

If rotative movement is permitted between the bearing and stuffing box with the gland 14 loose the accurate fit between the spherical bearing surfaces is destroyed and leakage may occur past the bearing. The present invention aims to prevent such wear between the bearing surfaces by positively locking the bearing against rotative movement with the stuffing box. To this end one of the bearing members is provided with an outwardly projecting lug 19 which fits in a longitudinal groove 20 in the outer end of the sleeve 12, as shown in Fig. 1, or in a similar groove 21 in the outer end of the gland, as shown in Fig. 5. In order to prevent relative rotation between the bearing members 15 and 16 the inner tapered faces of these members are provided with radially disposed grooves 22 into which the packing material is forced when the packing is squeezed between the bearing members. The packing thus forms an interlock between the bearing members when the bearing members are clamped together by tightening the gland 14.

As above stated, the lug 19 may be engaged either with a groove in the sleeve 12 or with a groove in the gland 14 and in either case the bearing is positively locked against turning movement within the stuffing box, there being sufficient clearance between the lug 19 and the bottom of the groove to permit the necessary rocking movement of the bearing in its spherical seat. The engagement of the lug 19 with the groove 21 of the gland, as shown in Fig. 5, has the advantage that a turning movement of the bearing with the shaft will automatically tighten the gland 14 until the bearing member is again tightly clamped between the gland and fixed sleeve, the pitch of the threads being so arranged that the gland is tightened by turning movement in the direction of rotation of the shaft.

Having thus described by invention, what I claim is:

1. In combination, a stuffing box comprising a sleeve adapted to have a shaft extend therethrough and a gland adjustable on said sleeve, said sleeve and gland having a pair of opposed annular seats, a bearing for the shaft comprising two separate members, interlocked with each other, each provided with a spherically curved portion engaging one of said seats and having a packing between them, and means interposed between the stuffing box and bearing for locking the bearing to a part of the stuffing box.

2. In combination, a stuffing box comprising a sleeve adapted to have a shaft extend therethrough and a gland adjustable on said sleeve, said sleeve and gland having a pair of opposed annular seats, a bearing for the shaft comprising two separate members, each provided with a spherically curved portion engaging one of said seats and having a packing between them, said bearing members having the opposed faces thereof which engage the packing provided with depressions to hold the packing and bearing members against relative turning movement, and means interposed between one of said bearing members and the stuffing box for locking the bearing members to a part of the stuffing box.

3. In combination, a stuffing box comprising a sleeve adapted to have a shaft extend therethrough and a gland adjustable on said sleeve, said sleeve and gland having a pair of opposed annular seats, a bearing for the shaft comprising two separate members, each provided with a spherically curved portion engaging one of said seats and having a packing between them, said bearing members having the opposed faces thereof which engage the packing provided with depressions to hold the packing and bearing members against relative turning movement, said stuffing box and one of said bearing members having interengaging parts which lock the bearing member against turning relative to a part of said stuffing box but which permit rocking movement of the bearing in the stuffing box.

4. In combination, a stuffing box comprising a sleeve adapted to have a shaft extend therethrough and a gland adjustable on said sleeve, said sleeve and gland having a pair of opposed annular seats, a bearing for the shaft comprising two separate members, each provided with a spherically curved portion engaging one of said seats and having a packing between them, said bearing members having the opposed faces thereof which engage the packing provided with depressions to hold the packing and bearing members against relative turning movement, said stuffing box and one of the bearing members having a lug and groove interengagement for holding the bearing member against turning relatively to a part of the stuffing box.

5. In combination, a stuffing box comprising a sleeve adapted to have a shaft extend therethrough and a gland adjustable on said sleeve, said sleeve and gland having a pair of opposed annular seats, a bearing for the shaft comprising two separate members, each provided with a spherically curved portion engaging one of said seats and having a packing between them, and means connecting said gland to one of said bearing members for automatically tightening the gland upon a turning movement of the bearing member with the shaft.

In testimony whereof I hereunto affix my signature.

JOHN O. SMITH.